(12) United States Patent
Saiz

(10) Patent No.: US 6,957,792 B2
(45) Date of Patent: Oct. 25, 2005

(54) LIFTING ARRANGEMENT FOR AIRCRAFT FUSELAGES

(76) Inventor: Manuel Munoz Saiz, Los Pico 5, 3, 6, Almeria (ES) 04004

( * ) Notice: Subject to any disclaimer, the term of this patent is extended or adjusted under 35 U.S.C. 154(b) by 0 days.

(21) Appl. No.: 10/606,096

(22) Filed: Jun. 25, 2003

(65) Prior Publication Data

US 2003/0234321 A1   Dec. 25, 2003

(30) Foreign Application Priority Data

| Sep. 6, 1996 | (ES) | ................................. 960104 |
| Aug. 7, 1997 | (ES) | ................................. 9707753 |
| Dec. 1, 1999 | (ES) | ................................. 9902646 |
| Dec. 20, 1999 | (ES) | ................................. 9902785 |
| Sep. 12, 2002 | (ES) | ................................. 200202089 |

(51) Int. Cl.$^7$ ............................................. B64C 1/00
(52) U.S. Cl. ..................... 244/36; 244/130; 244/105; 244/106
(58) Field of Search ................... 244/117 R, 35 R, 244/35 A, 13, 15, 198, 35, 36, 130, 105–106; D12/321, 341

(56) References Cited

U.S. PATENT DOCUMENTS

| D85,198 | S | * | 9/1931 | Papke ....................... D12/321 |
| 1,876,635 | A | * | 9/1932 | Deutscher |
| 2,020,616 | A | * | 11/1935 | Molicki |
| 3,310,262 | A | | 3/1967 | Robins |
| 3,385,538 | A | | 5/1968 | Hodges |
| 3,625,459 | A | * | 12/1971 | Brown ....................... 244/35 R |
| 4,381,091 | A | | 4/1983 | Pegram |
| 4,691,881 | A | * | 9/1987 | Gioia ........................ 244/106 |
| 4,708,305 | A | * | 11/1987 | Kelley et al. |
| 4,735,381 | A | | 4/1988 | Wood |
| 4,828,204 | A | | 5/1989 | Friebel |
| 5,415,365 | A | * | 5/1995 | Ratliff ....................... 244/105 |
| 5,711,494 | A | | 1/1998 | Saiz |
| 5,899,409 | A | | 5/1999 | Frediani |
| 6,053,453 | A | | 4/2000 | Saiz |
| 6,082,668 | A | | 7/2000 | Saiz |
| 6,098,922 | A | | 8/2000 | Hahl |
| 6,138,946 | A | | 10/2000 | Saiz |
| 6,290,174 | B1 | * | 9/2001 | Gioia ........................ 244/105 |
| 6,378,803 | B1 | | 4/2002 | Saiz |
| 6,446,908 | B1 | | 9/2002 | Saiz |

FOREIGN PATENT DOCUMENTS

| DE | 41 35 783 | 5/1993 |
| GB | 1044922 | 1/1964 |

* cited by examiner

Primary Examiner—Michael J. Carone
Assistant Examiner—Lulit Semunegus
(74) Attorney, Agent, or Firm—Robert M. Schwartz

(57) ABSTRACT

A lifting arrangement for aircraft fuselages that consists of placing longitudinal vertical or slanted fins or plates on the lower and lateral lower part of the whole fuselage, said fins forming a channel with the underside of the fuselage, including nose, fuselage and tail, open on their lower area. Further adding longitudinal horizontal or laterally slanted fins on the lateral middle or middle-to-low area of the fuselage and with a positive slope up to the nose with said fins arranged in such a way that the upper fins are projected increasingly laterally, and because of this arrangement and their slope up to the nose, the air flow is directed downward and backward.

19 Claims, 2 Drawing Sheets

LIFTING ARRANGEMENT FOR AIRCRAFT FUSELAGES

CROSS REFERENCE TO RELATED APPLICATIONS

This application claims the benefit of priority dates of Spanish Patent Nos. P9601904 filed on Sep. 6, 1996; No. P9701753 filed on Aug. 7, 1997; No. P9902785 filed on Dec. 20, 1999; No. P9902646 filed on Dec. 1, 1999; and P200202089 filed on Sep. 12, 2002. The basis for priority in this case is the Paris Convention for the Protection of Industrial Property (613 O.G. 23,53 Stat 1748). The Spanish patent applications were filed in The Official Patent and Trademarks Office of Spain.

DESCRIPTION OF THE INVENTION

A lifting arrangement for aircraft fuselage including placing longitudinal vertical or slanted fins or plates on the lower and lateral lower part of the whole fuselage, further including the nose and tail, thus avoiding the lateral slip of the airflow that presses on the underside of the fuselage when it advances with a certain angle of positive attack, resulting in the production of strong lift. The fins form large channels with the underside of the fuselage, and are open on their lower area.

Also, longitudinal horizontal or laterally slanted fins can be added on the lateral middle or middle-to-low area of the fuselage in order to increase the lift, particularly at low speeds. Upon increasing the angle of attack, the lift produced is such that, in addition to the wings, the flaps can be eliminated. The fins can be slanted or turned laterally, and are arranged in such a way that the upper fins are projected increasingly laterally. This arrangement, and its positive slope up to the nose direct the air flow backward and downward, thereby producing complementary lift.

At either cruising speed or high speed, a small angle of attack of the fuselage is sufficient in order to produce either completely or partially the lift generated by the wings.

The fins or plates can be flat or curved around an axis approximately parallel to the longitudinal axis of the fuselage, that is, with the convexity towards the exterior. This curvature reduces the impact of the lateral wind.

The fins, although generally fixed, are capable of rotation or retraction in order to reduce friction.

The lower surface of the fuselage can be flat or shaped in a circular or elliptical arc cross-section, with the preferable embodiment having a flat lower surface.

The upper surface of the fuselage can be flat, although preferably it will be shaped in a circular or elliptical arc cross-section.

The lateral surfaces of the fuselage can be curved or flat in cross-section.

Elongated fuselages with the following shapes or constant cross-sections may be implemented: circular, semicircular with flat lateral walls, oval, circular segment, oval segment or rectangular with rounded sides, and mainly narrowed or flattened vertically.

The vertically flattened fuselages are less affected by side winds.

The fuselage may generally have a sloped nose and tail, illustrated in FIG. 1. The upper forward and rear areas will preferably be aerodynamically curved, profiled or streamlined. This is the only aircraft where the nose, fuselage and tail produce the whole lift.

The fins can be added to current conventional fuselages in order to obtain the benefit of added lift, without the need for making major changes, and their lower fins can have a positive-angled slope.

The area of the fuselage between the nose and the tail can have a thickness widening from a lesser to greater degree towards the rear, in such a way that at cruising speed, when the lower surface forms a certain positive angle with the horizontal, the upper side will be completely horizontal, thus avoiding or delaying the separation of the boundary layer.

The fuselage may be slightly curved lengthwise with its underside concave.

The main landing gear may be displaced backward.

Small thin wings, stabilizing fins or a large conventional stabilizer, which do not produce lift, are only necessary to provide complementary lift.

The total drag to forward movement is much lower than that of conventional aircraft with wings.

The advantages of the current invention include the generation of strong lift, with the possibility of eliminating the flaps and the wings completely. The aircraft accelerates quicker during take-off resulting from the elimination of flap use Further, the major lift will come about during rotation, for which reason the runway length required will be much shorter. The current invention also would weigh less or can carry a heavier payload. The current invention is simpler, more economical, has a lower total drag, and is useful for all fuselages as the lift is produced by the whole underside of the aircraft.

MORE DETAILED DESCRIPTION OF THE DRAWINGS

Figure 1:
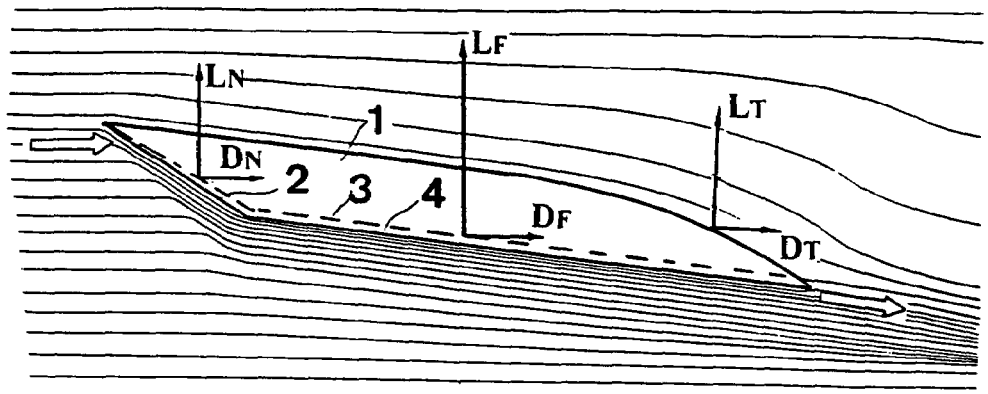
FIG. 1 shows a schematic lateral view of one of the fuselages in the invention with the longitudinal fins or plates on its lateral lower part.

FIG. 1 shows the upper surface of the fuselage (1), the longitudinal fins on the lateral lower part of the nose (2), the underside of the fuselage (3), and the longitudinal fins or plates on the lower and lateral lower part of the fuselage (4). The streamlines flow and arrows show the downward displacement of the airflow and as a result the forces generated on the fuselage. The nose lift force (LN) and its drag (DN), the lift of the underside of the fuselage (LF) and its drag (DF), and the tail lift force (LT) and its drag (DT).

Figure 2:
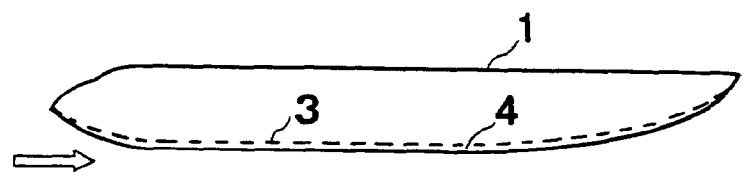
FIG. 2 shows a schematic lateral view of a current fuselage with the longitudinal fins in the invention.

FIG. 2 shows the upper zone or surface of a conventional fuselage (1), the underside of the fuselage (3) and the longitudinal fins on the lateral lower part of the fuselage (4).

Figure 3:
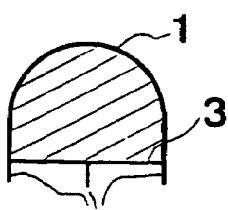
FIG. 3 shows a schematic cross-sectional view of a variant of a fuselage and its fins.

FIG. 3 shows the upper zone or surface of a fuselage of semicircular cross-section (1) using flat lateral walls, the underside of the fuselage (3) and the longitudinal flat fins on the lower and lateral lower part of the fuselage (4), with said fins forming large channels with the underside of the fuselage and open on their lower area.

Figure 4:
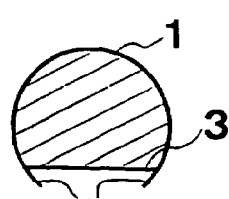
FIG. 4 shows a schematic cross-sectional view of a variant of a fuselage and its fins.

FIG. 4 shows the upper zone or surface of a fuselage of circular segment cross-section (1), the underside of the fuselage (3) and the longitudinal curved fins on the lateral lower part of the fuselage (4), with the upper fins projected increasingly laterally.

Figure 5:
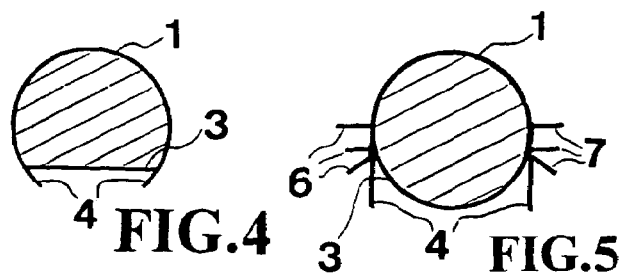
FIG. 5 shows a schematic cross-sectional view of a variant of a fuselage and its fins.

FIG. 5 shows the upper zone or surface of a fuselage of circular cross-section (1), the underside of the fuselage (3), the longitudinal flat fins on the lateral lower part of the fuselage (4), the longitudinal horizontal or laterally slanted fins (6 and 7) added on the lateral middle or middle-to-low area of the fuselage with a slight positive slope up to the nose, including fins which can be slanted or turned laterally.

Figure 6:
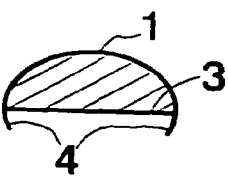
FIG. 6 shows a schematic cross-sectional view of a variant of a fuselage and its fins.

FIG. 6 shows the upper zone or surface of an oval segment cross-section fuselage (1), the underside of the fuselage (3) and the longitudinal curved fins on the lateral lower part of the fuselage (4).

Figure 7:
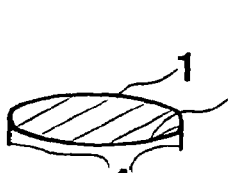
FIG. 7 shows a schematic cross-sectional view of a variant of a fuselage and its fins.

FIG. 7 shows the upper zone or surface of an oval and flattened cross-section fuselage (1), the underside of the fuselage (3) and the longitudinal flat fins on the lateral lower part of the fuselage (4).

Figure 8:
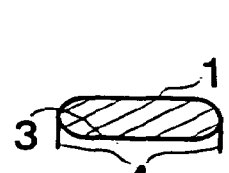
FIG. 8 shows a schematic cross-sectional view of a variant of a fuselage and its fins.

FIG. 8 shows the upper zone or surface of a fuselage (1) whose cross-section is rectangular with rounded sides, the underside of the fuselage (3) and the longitudinal fins on the lateral lower part of the fuselage (4).

Figure 9:
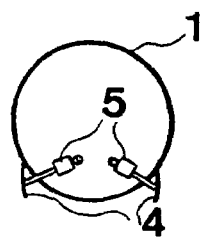
FIG. 9 shows a schematic cross-sectional view of a variant of a fuselage and its fins.

FIG. 9 shows the upper zone or surface of a fuselage (1), the longitudinal fins on the lateral lower part of the fuselage (4), and the rams (5) that act the fins.

Figure 10:
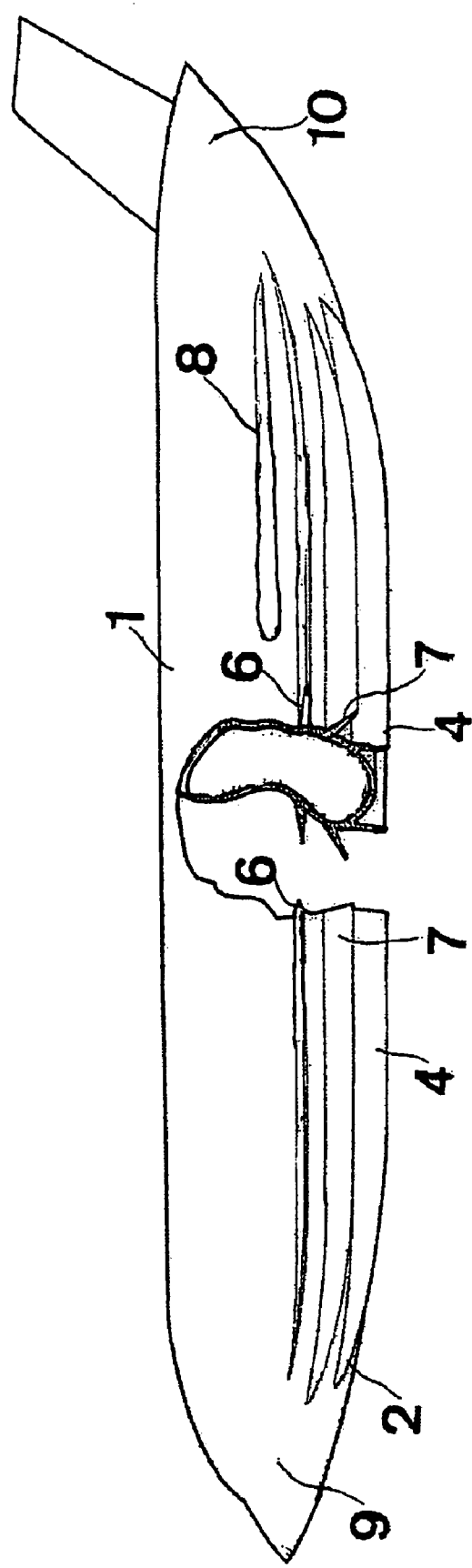
FIG. 10 shows a perspective view of an aircraft with the longitudinal fins in the invention.

FIG. 10 shows the fuselage (1), the longitudinal vertical fins on the lateral lower part of the nose (2), the longitudinal vertical fins on the lateral lower part of the fuselage (4), the longitudinal horizontal fin on the lateral lower part of the fuselage (6), the longitudinal slanted fin on the lateral or lateral lower part of the fuselage (7) and the wing (8). FIG. 10 also shows the nose (9) and tail (10) of the fuselage.

What is claimed is:

1. A lifting arrangement for an aircraft fuselage, comprising:
at least one first longitudinal fin and at least one second longitudinal fin, each of the fins positioned on lateral lower portions of the fuselage, the at least one first and at least one second longitudinal fins forming a channel with the underside of the fuselage, the channel including the nose and tail of the fuselage, and the at least one first and at least one second longitudinal fins being curved around an axis approximately parallel to a longitudinal axis of the fuselage, the convexity of the at least one first and at least one second longitudinal fins being towards an exterior of the fuselage.

2. The lifting arrangement of claim 1, further comprising a third longitudinal fin positioned on the lower portion of the fuselage.

3. The lifting arrangement of claim 1, further comprising a third longitudinal fin and a fourth longitudinal fin, each of the fins positioned on lateral middle portions of the fuselage.

4. The lifting arrangement of claim 1, further comprising a third longitudinal fin and a fourth longitudinal fin, each of the fins positioned on middle-to-low portions of the fuselage.

5. The lifting arrangement of claim 3, further comprising a fifth longitudinal fin and a sixth longitudinal fin, each of the fins positioned on middle-to-low portions of the fuselage.

6. The lifting arrangement of claim 5, further comprising a seventh fin positioned on the lower portion of the fuselage.

7. The lifting arrangement of claim 1, wherein the at least one first and at least one second longitudinal fins are flat.

8. The lifting arrangement of claim 1, wherein the at least one first and at least one second longitudinal fins are retractable.

9. The lifting arrangement of claim 1, wherein the fuselage is elongated and has a constant circular cross-section.

10. The lifting arrangement of claim 1, wherein the fuselage is elongated and has a constant semicircular cross-section with flat lateral walls.

11. The lifting arrangement of claim 1, wherein the fuselage is elongated and has a constant oval cross-section.

12. The lifting arrangement of claim 1, wherein the underside of the fuselage is flat.

13. The lifting arrangement of claim 1, wherein the at least one first and at least one second longitudinal fins are fixed.

14. The lifting arrangement of claim 1, wherein the area of the fuselage between the nose and the tail of the fuselage has a thickness widening from a lesser to a greater degree towards the rear of the fuselage.

15. The lifting arrangement of claim 1, wherein the upper surface of the fuselage has an elliptical cross-section.

16. The lifting arrangement of claim 1, wherein the at least one first and at least one second longitudinal fins are vertical.

17. The lifting arrangement of claim 3, wherein the third and the fourth longitudinal fins are positioned horizontally and laterally.

18. The lifting arrangement of claim 4, wherein the third and the fourth longitudinal fins are positioned horizontally and laterally.

19. The lifting arrangement of claim 4, wherein the third and the fourth longitudinal fins are laterally slanted.

* * * * *